E. A. RUNDLÖF.
COUPLING.
APPLICATION FILED MAR. 20, 1913.

1,144,067. Patented June 22, 1915.
2 SHEETS—SHEET 1.

Witnesses.

Inventor:
Erik Anton Rundlöf

UNITED STATES PATENT OFFICE.

ERIK ANTON RUNDLÖF, OF STOCKSUND, SWEDEN.

COUPLING.

1,144,067.  Specification of Letters Patent.  Patented June 22, 1915.

Application filed March 20, 1913. Serial No. 755,791.

*To all whom it may concern:*

Be it known that I, ERIK ANTON RUNDLÖF, a subject of the King of Sweden, residing at Stocksund, in the Kingdom of Sweden, have invented new and useful Improvements in Couplings, of which the following is a specification, reference being had to the drawings accompanying and forming a part hereof.

My invention relates to improvements in couplings for transmitting rotary motion between a driving and a driven member of the type in which rollers or balls are used in such manner that they become clamped or pressed between one of the members and the oblique surfaces of a sleeve arranged in suitable relation to both the members, the arrangement being such that the rollers will become automatically clamped or automatically loosened and thus the coupling closed or opened at the will of the operator.

The object of my invention is to accomplish a coupling of this type which shall be efficient and reliable in its operation and simple of construction and which shall be suitable for rotation in either direction. To gain this object my invention comprises the combination of a driving member, a driven member, a sleeve having a plurality of oblique faces arranged to have a limited motion in either direction between said members, and a plurality of rollers arranged to be pressed between said faces and one of the members and to transmit motion between the members.

The invention is further characterized thereby that the oblique surfaces of the sleeve are located symmetrically in relation to each other, and thereby that the sleeve is arranged to have a limited motion which is independent of the motion of either one of the said members.

My invention is illustrated in the accompanying drawings in which—

Figure 1:
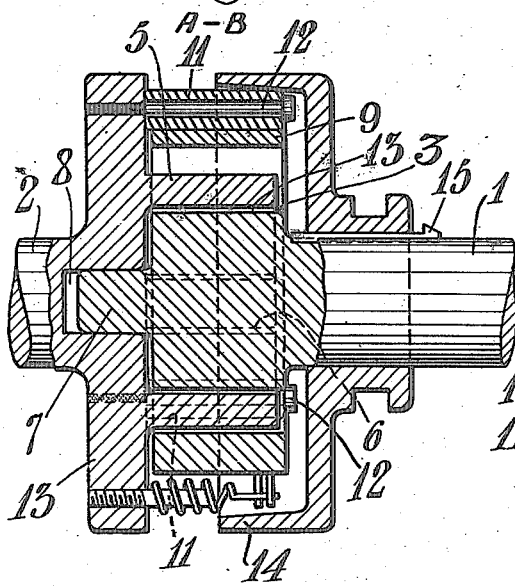
Figure 2:
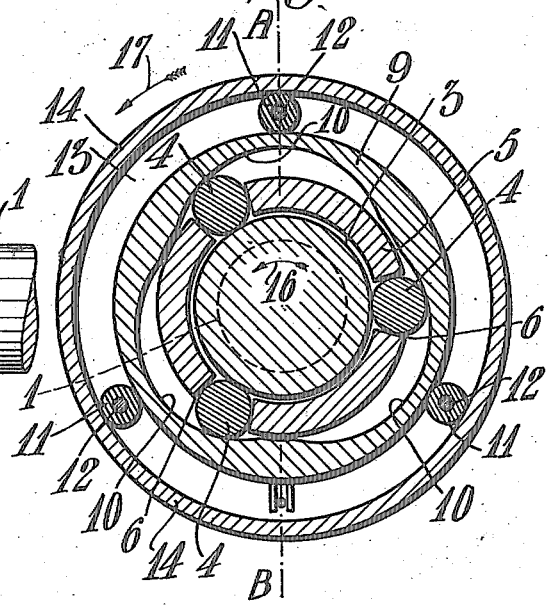
Figure 3:
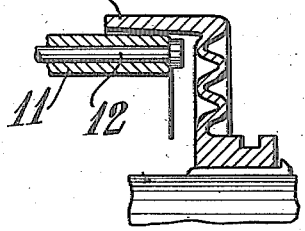
Figure 4:
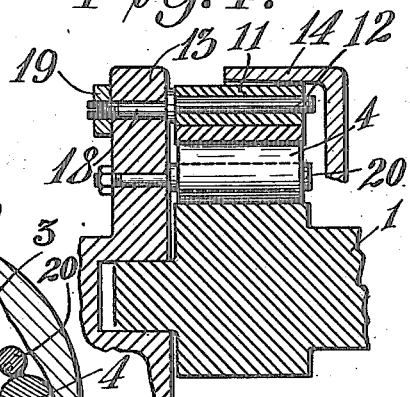
Figure 5:
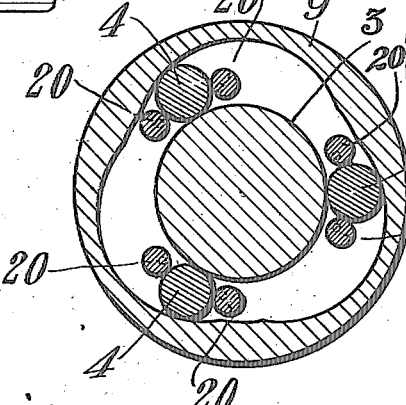
Figure 6:
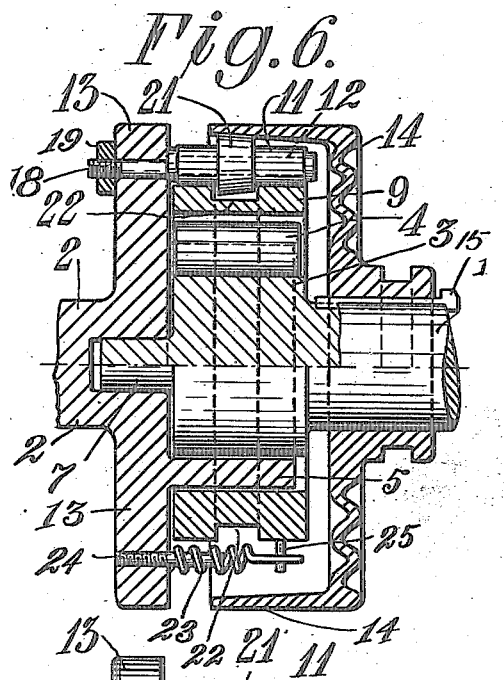
Figure 7:
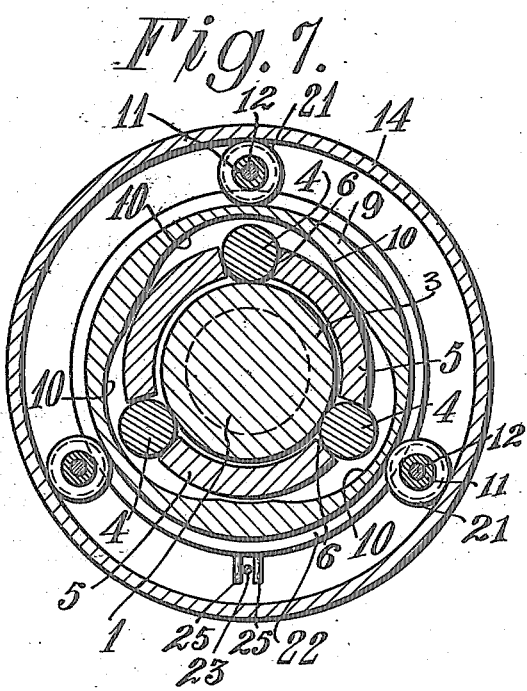
Figure 8:
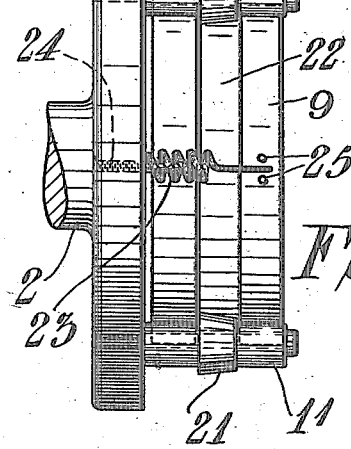
Figure 9:
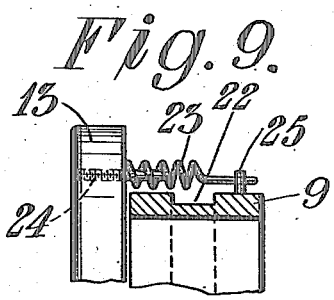

Figure 1 is a longitudinal sectional view of the coupling, Fig. 2 is a sectional end view, Figs. 3, 4 and 5 illustrate modified details of the coupling. Fig. 6 shows a detail of a modification of the coupling, and Fig. 7 shows a sectional end view of the same modification. Fig. 8 is an outside view of this coupling, and Fig. 9 is a detail sectional view thereof.

All the couplings shown on the drawings are suitable for the propeller shaft of a motor driven boat.

Referring to the drawings in detail 1 represents the shaft of the motor, and 2 the propeller shaft. The part 3 of the motor shaft against which the rollers 4 press is preferably of enlarged diameter. The end of the propeller shaft 2 which belongs to the coupling is formed with a sleeve 5 inclosing the track 3 and provided with slots 6, in which the rollers 4 are placed loosely.

In order to retain the two shafts 1 and 2 in a straight line the shaft 1 may suitably be formed with a journal 7 which has a sliding fit in a central cavity formed at the end of the shaft 2. This arrangement is of course not necessary if the ends of the two shafts are journaled in sufficiently steady bearings. The rollers 4 are surrounded by the sleeve 9, the inside of which is formed with the wedge-shaped or oblique surfaces 10, against which the rollers 4 are to be clamped or pressed at the same time as they are pressed against the track 3 formed upon the end of the shaft 1. Upon the outside circumference of the ring 9 the rollers 11 touch loosely, said rollers being loosely mounted on studs 12 fastened in a disk 13, formed integrally with the shaft 2. The outer ends of the rollers 11 touch against the beveled inside face of a ring 14 which is slidably mounted upon the shaft 1, being splined thereto by means of a key 15 so that the ring 14 rotates with the shaft 1. The ring 14 is arranged to be moved in axial direction upon the shaft 1 by means of a lever or spring (not shown).

The coupling operates in the following manner: The motor shaft 1 is supposed to rotate in the direction of the arrow 16 and the ring 14 in the same direction according to the arrow 17 and with the same speed. If the ring 14 is moved to the left (Fig. 1) its beveled inside face will press against the rollers 11 so that they will be brought into firm contact with the outside of the sleeve 9 at the same time as they will be brought into rotation by the ring 14. The sleeve 9 will then be moved by the rollers 11 in a direction opposite to the direction of rotation of the ring 14 so that the rollers 4 become firmly pressed between the track 3 and the sleeve 9. The rollers 4 must then partake in the rotation of the shaft 1 and will carry along the sleeve 5, that is to say the shafts 1 and 2 are coupled together. If the ring 14 be moved back to the right (Fig. 1) the action of the rollers 11 against the sleeve 9 will cease. The sleeve 9 will then be turned backward, through a small but definite distance, partly by reason of the shape of its oblique surface, and partly by reason of the fact that the sleeve will spring to some extent when liberated from the pressure of the rollers 11. The rollers 4 are now no longer clamped between the shaft 1 and the sleeve 9 and have no further action on the shaft 2 which will now stop its rotation. In order to insure that the sleeve 9 will become loosened when so desired one or several springs may be applied between the sleeve 9 and the disk 13 in the same manner as is hereinafter described in connection with Figs. 6 to 9, inclusive.

If the direction of rotation of the motor shaft is reversed, which can be done directly by the motor, the coupling will act in the same manner, since the oblique surfaces 10 which act on the rollers are shaped symmetrically so that their action upon the rollers will be the same for rotation in either direction.

In order to secure the best efficiency from the coupling it is important that all the rollers 4 shall occupy uniform positions relatively to the parts 3, 9 and 5. The coöperation between the rollers and the said parts will be satisfactory as long as the shafts 1 and 2 are located in a straight line. If however, by reason of wear of the journal 7 or for some other reason, the correct relative position of the two shafts is disturbed or altered, then the ring 14 will occupy an eccentric position relatively to the rollers 11, so that when the coupling is to be closed, the rollers 11 will cause also the sleeve 9 to occupy an eccentric position resulting in a non uniform distribution of pressure between the rollers 4 and the surfaces 10. In order that the ring 14 shall not in such manner force the sleeve 9 out of its central position, the ring 14 may preferably, as shown in Figs. 3 and 6, be made somewhat springy or yielding for instance by means of corrugations, so that the ring 14 will yield to the resistance of an eccentrically located roller 11, the eccentric dislocation being thus transferred to said ring and having no hurtful influence upon the centering of the sleeve 9. It is also important that the rollers 11 shall press in a uniform manner against the sleeve 9. In order that the position of the rollers 11 may be adjusted in relation to the sleeve 9, I prefer to fasten their studs 12 to the disk 13 by means of eccentrics 18 secured to the disk by means of nuts 19 as shown in Figs. 4 and 6. Upon loosening the nuts 19 the eccentrics 18 may be freely turned in the disk 13, and thus the rollers adjusted in relation to the sleeve 9. In accordance with Figs. 4 and 5 a similar arrangement may also be used for adjusting the position of the rollers 4. The rollers 4 make contact against the eccentrics 20 which are fastened to the disk 13, as shown in Fig. 4, so that by turning the studs 20 the position of the rollers 4 may be adjusted.

In the coupling above described the ring 14 acts upon the outer ends of the rollers 11 and as a result the rollers will not touch with their whole length against the sleeve 9. In the modified coupling shown in Figs. 6-9 a uniform contact between the sleeve and the whole length of a roller 11 is obtained by enlarging the diameter of the central part of the roller. The ring 14 is arranged to press against this central part of the roller, and thus the pressure of the roller against the sleeve 9 will be uniform along the whole length of the roller. As shown in Fig. 6 the sleeve 9 is provided with a groove 22 to accommodate the enlarged central part 21 of the roller 11, which central part is pressed by the ring 14.

Another advantage of this construction is that by reason of the unequal diameters of the roller 11 the sleeve 9 will rotate with a smaller circumferential speed than the ring 14. The closing of the coupling will therefore be effected in a manner more free from shocks than if the sleeve and the ring rotate with the same speed. The arrangement shown in Figs. 6 to 9 will also act so as to bring about such a result. To the disk 13 which is joined to shaft 2 and supports the rollers 11 is fastened one or several spiral springs 23. Each spiral spring 23 is attached at one end to a stud 24 fastened in the disk 13, and its other straight end is placed between two studs 25 fastened to the sleeve 9.

The relative positions of the studs 24 and 25 are so adjusted that when the spring is not bent as shown in Fig. 8, then it will hold the sleeve 9 in such position (see Fig. 7) that each roller 4 will be located at the central part of the oblique surface 10 formed upon the inside of the sleeve 9. When the coupling is open and the sleeve 9 is loose so that it can be moved by the spring 23, the rollers and the sleeve will occupy the aforesaid position. When the coupling is to be closed the sleeve 9 need not move farther than half the length of the oblique surface 10. The spring 23 will also give the advantage that the sleeve 9 shall not for instance by vibrations in the machinery be turned accidentally so as to come unduly into contact with the rollers 4. An accidental or undesired closing of the coupling is thus prevented.

The device illustrated in Figs. 6 to 9 inclusive operates substantially in the same manner as the device shown in Figs. 1 and 2 hereinbefore described, and hence further description of such operation is deemed unnecessary.

Having thus described my invention what I claim is:

1. The combination of a driving member, a driven member, a sleeve having a plurality of oblique faces arranged to have a limited motion in either direction between said members, a plurality of rollers arranged to be pressed between the faces and one of the members, a plurality of other rollers resting against the outside circumference of the sleeve, and a ring attached to one of the members and arranged to press against the latter said rollers.

2. The combination of a driving member, a driven member, a sleeve having a plurality of oblique faces arranged to have a limited motion in either direction between said members, a plurality of rollers arranged to be pressed between the faces and one of the members, a plurality of other rollers resting against the outside circumference of the sleeve, and a springy yielding ring attached to one of the members and arranged to press against the latter said rollers.

3. The combination of a driving member, a driven member, a sleeve having a plurality of oblique faces arranged to have a limited motion in either direction between said members, a plurality of rollers arranged to be pressed between the faces and one of the members, a plurality of eccentric studs fastened to one of the members, a roller mounted loosely on each stud and resting against the outside circumference of the sleeve, and a ring attached to the other member and arranged to press the latter said rollers against the sleeve.

4. The combination of a driving member, a driven member, a sleeve having a plurality of oblique faces arranged to have a limited motion in either direction between said members, a plurality of rollers mounted on one of the members and arranged to be pressed between the faces and the other member, a plurality of studs fastened to the first member, a roller mounted loosely upon each stud, the central part of said roller being of greater diameter than the diameter at either end of the roller, and a ring attached to the second said member and arranged to press against the central part of said roller and force the roller against the sleeve.

5. The combination of a driving member, a driven member, a sleeve having a plurality of oblique faces arranged to have a limited motion in either direction between the members, a plurality of rollers mounted on one of the members and arranged to be pressed between the faces and the other member, a plurality of studs fastened to the first member, a roller mounted loosely upon each stud, the central part of said roller being of greater diameter than either end of the roller, a ring attached to the second said member and arranged to press against the central part of said roller, so as to force the roller against the sleeve, and a spring fastened between the sleeve and the first said member.

6. The combination of a driving member, a driven member, a sleeve having a plurality of oblique faces arranged to have a limited motion in either direction between the members, a plurality of rollers mounted on one of the members and arranged to be pressed between the faces and the other member, a plurality of studs fastened to the first member, a roller mounted loosely upon each stud, the central part of said roller being of greater diameter than either end of the roller, a ring attached to the second said member and arranged to press against the central part of said roller, so as to force the rollers against the sleeve, two studs (25) fastened to the sleeve, and a spiral spring fastened with one end to the first said member, the other end of the spring being placed between the studs (25).

ERIK ANTON RUNDLÖF.

Witnesses:
 GRETA PRIM,
 KOUR DAHLQUIST.